350-96.24 SR

XR 3,809,893

SEARCH ROOM

United States Patent [19]

Dobras

SUBSTITUTE FOR MISSING XR

[11] 3,809,893

[45] May 7, 1974

[54] OPTICAL READER

[75] Inventor: Bruce W. Dobras, Dayton, Ohio

[73] Assignee: The Monarch Marking Systems Company, Dayton, Ohio

[22] Filed: Feb. 9, 1973

[21] Appl. No.: 330,937

Related U.S. Application Data

[63] Continuation of Ser. No. 104,894, Jan. 8, 1971, abandoned.

[52] U.S. Cl. .................................. 250/227, 250/568

[51] Int. Cl. .............................................. G02b 5/14

[58] Field of Search ....... 250/227, 237, 239, 219 D, 250/219 DC, 219 CR; 350/968; 317/2 R, 2 J

[56] References Cited

UNITED STATES PATENTS

| | | | |
|---|---|---|---|
| 3,099,750 | 7/1963 | Swarthout | 250/239 |
| 3,473,087 | 10/1969 | Slade | 317/2 J |
| 3,673,417 | 6/1972 | Wahli | 250/227 |
| 3,214,596 | 10/1965 | Schwerdt | 250/219 D |
| 3,509,354 | 4/1970 | Reilly | 250/227 |
| 3,166,688 | 1/1965 | Rowand | 317/2 J |
| 3,415,433 | 12/1968 | Shaw | 250/219 FR |
| 2,840,722 | 6/1958 | Frommer | 250/219 DR |
| 3,305,689 | 2/1967 | Leavy | 250/227 |
| 3,182,291 | 5/1965 | Nassimbene | 250/227 |
| 3,327,584 | 6/1967 | Kissinger | 250/227 |

*Primary Examiner*—Archie R. Borchelt
*Assistant Examiner*—D. C. Nelms
*Attorney, Agent, or Firm*—Joseph J. Grass

[57] ABSTRACT

There is disclosed an optical reader for reading a record. The user can hold the reader in his one hand and scan a binary coded record. The reader has an elongated housing for mounting a record illuminator, a lens for gathering light reflected or diffused from the record, a mask having an aperture, and a light receptor spaced from the aperture which receives light passing through the aperture. The housing carries a removable, replaceable, tip which is composed of plastic material having a low coefficient of friction and which preferably contains electrically conductive material for rendering the tip electrically conductive to retard the accumulation of dust, lint and the like on the tip.

2 Claims, 5 Drawing Figures

OPTICAL READER

CROSS-REFERENCE TO RELATED APPLICATION

This application is a continuation of copending application Ser. No. 104,894, filed Jan. 8, 1971, now abandoned.

BACKGROUND OF THE INVENTION

1. Field of the Invention

This invention relates to the art of optical readers.

2. Brief Description of the Prior Art

The prior art includes a number of patents relating to optical readers, such as U.S. Pat. Nos. 2,838,683; 2,933,612; 3,130,317; 3,182,291; 3,238,501; 3,247,391; 3,334,236; 3,349,246; 3,383,979; 3,417,234; 3,483,385 and 3,509,353.

SUMMARY OF THE INVENTION

The invention resides in a low-cost optical reader including a housing for an illuminator for directing light at a record, a lens for gathering light reflected or diffused from the record, a mask having an aperture, and a light receptor spaced from said mask, so that the mask is disposed between the lens and the light receptor. This arrangement provides reception of light from a relatively small zone on the record. The invention is applicable to an optical reading function irrespective of whether the reader moves with respect to the record or the record moves with respect to the reader to bring the area to be scanned or read into the reading position. A removable and replaceable tip for the housing is constructed of a plastic material having a low coefficient of friction. It is preferred to construct the plastic tip with means to render the tip electrically conductive to retard the accumulation of dust, lint and the like, more specifically electrically conductive materials such as metal particles, filaments or the like are preferably in with the plastic material which comprises the tip.

DETAILED DESCRIPTION OF THE PREFERRED EMBODIMENT

Figures 1, 2, 3, 4, 5:
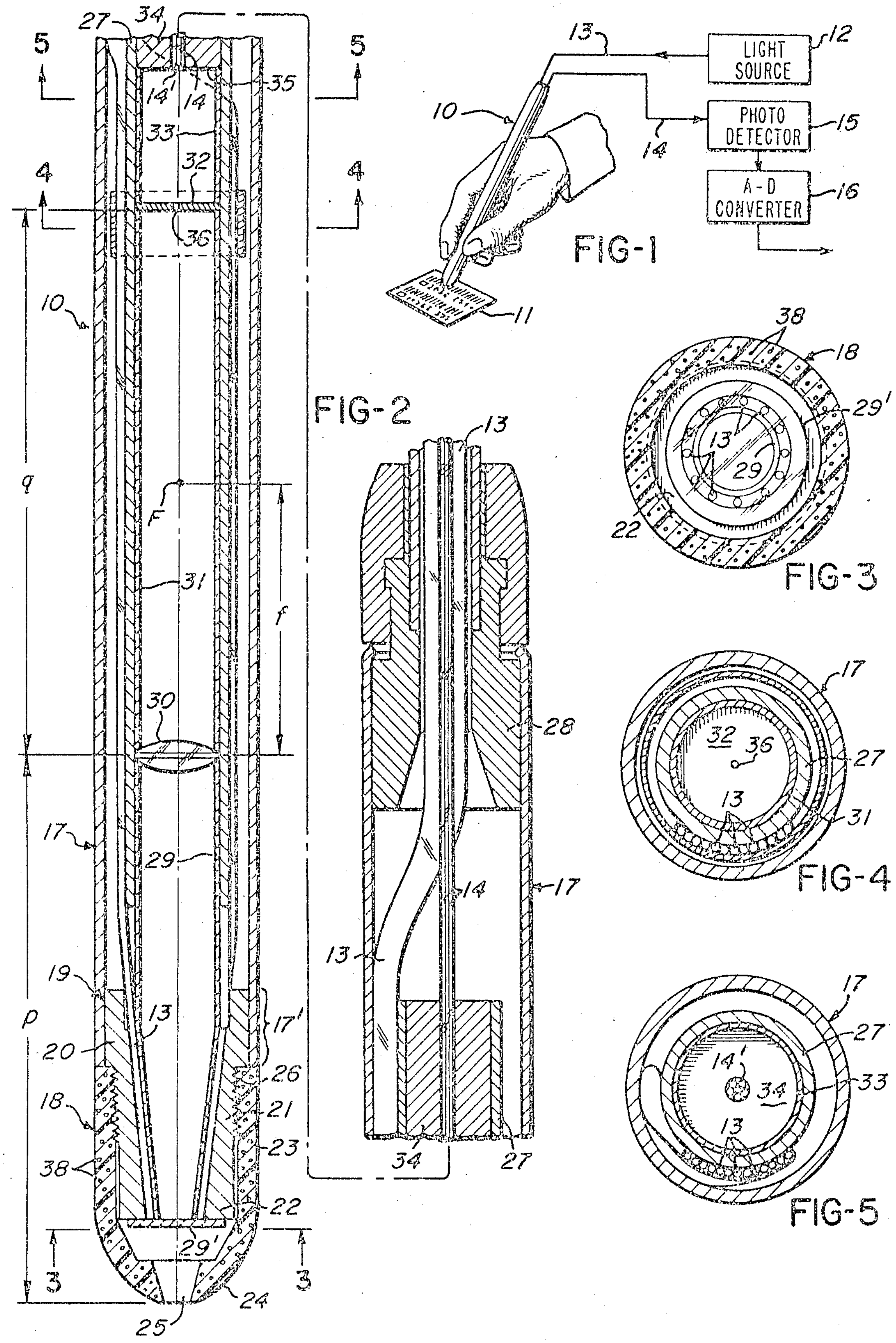
FIG. 1 is a perspective view of a hand-held optical reader in accordance with the invention being used to scan a record.
FIG. 2 is an elevational section view of the reader shown in FIG. 1, the reader being shown in two parts for clarity.
FIG. 3 is a sectional view taken along line 3—3 of FIG. 2.
FIG. 4 is a sectional view taken along line 4—4 of FIG. 2.
FIG. 5 is a sectional view taken along line 5—5 of FIG. 2.

With reference to FIG. 1 there is shown a hand-held optical reader generally indicated at 10 which is capable of being moved relative to a stationary coded record member 11. The illustrated record member 11 is shown to have alternating bar-shaped areas with optically different characteristics, such as dark and light. The reader 10 is connected to a light source 12 by a bundle of optical fibers 13 which direct light from the source 12 to the record member 11. A bundle of optical fibers 14 conducts light from the reader 10 to a photodetector 15. The photodetector 15 senses the difference in the amount of reflected and diffused light received via optical fibers 14 as the reader 10 is moved relative to dark and light areas on the record member 11. The photodetector 15 applies an analog signal to an analog-to-digital converter 16 which in turn applies a digital signal to a utilization device (not shown).

The reader 10 includes an elongated housing 17 which can be conveniently held in the user's hand as he scans the code data on the record member 11. Removably secured to the front of the housing 17 is a guide member in the form of a tip 18. As the user moves the reader 10 across and in contact with the record member 11 to scan the code data on the record member 11, the tip 18 serves as a guide and therefore assures that the object distance $p$ remains the same or substantially the same throughout the scanning movement.

A connector 19 has an annular portion 20 received by and securely held in a marginal end portion 17' of the housing 17. The connector 19 also has a threaded portion 21 and a reduced diameter portion 22. The threaded portion 21 is disposed between the annular portion 20 and the reduced portion 22. The tip 18 is shown to have a cylindrical portion 23 joined to a rounded end portion 24. The tip 18 has an opening 25 extending through the rounded end 24. The cylindrical portion 23 is internally threaded as indicated at 26 and is threadably received by the threaded portion 21 of the connector 19.

The bundle of optical fibers 13 extend into the housing 17 through a tubular section 27, into the space between the housing 17 and an inner sleeve 28, and into the connector 19 and the tip 18. As shown in FIGS. 2–5, the optical fibers 13 extend into the reader 10 as a bundle and spread out so that the ends of the fibers 13 which terminate at the end of the connector 19 are disposed in an annular array as best shown in FIG. 3. A sleeve 29 is shown in FIG. 2 to extend from the end of the connector 19 and the optical fibers 13 to the marginal edge of a lens 30. A transparent shield 29' adhesively secured to the end of the annular portion 22, closes off the space within the sleeve 29. Another sleeve 31 received in the sleeve 27 abuts the marginal edge of the lens 30 at its one end and a mask 32 at its other end. The sleeves 29 and 31 serve to mount the lens in a predetermined position inside the sleeve 27. Another sleeve 33 is shown to abut the mask 32 at its one end and a block 34 at its other end. The block 34 is received in and mounted by the sleeve 27. The blocks 34 mounts the end of the bundle of optical fibers 14. The end of the bundle of fibers 14 is shown to terminate at the end of the block 34. The ends of the optical fibers 14 are considered to provide a light receptor or light receiving surface 14'. The inside surfaces of the sleeves 28, 29 and 33, opposite surfaces of the mask 32, and the surface 35 of the block 34 are preferably dull and blackened. The arrangement of the invention is such that the mask 32 is disposed between the lens 30 and the light receptor 14' and the lens 30 is disposed between the coded data on the record to be scanned and the mask 32. Importantly, light receptor 14' is spaced from the aperture 36 in the mask 32. The mask 32 is in the shape of a disk and has a central light aperture 36. The opening 25, the lens 30, the aperture 36 in the mask 32 and the receptor 14' are disposed in axial alignment with respect to each other. Light entering the reader 10 through the opening 25 is gathered by the lens 30 and is imaged by the lens 30 on the mask 32. The focal point F of the lens 30 is between the lens 30 and the mask 32. In the illustrated embodiment, the focal point F is half-way between the lens 30 and the mask 36, the focal length $f$ is equal to one half the image distance $q$, and the image distance $q$ is equal to the object distance $p$. The lens 30 is located relative to the mask 32 and the record member 11 being scanned such that only light reflected or diffused from a small area on the record member proportional in size and shape to the aperture 36 in the mask 32 will pass through the aperture 36. In the illustrated embodiment, the size of the area being scanned on the record member 11 is equal to the size and shape of the aperture 36. Only the light energy passing through the light aperture 36 is received by the light receptor 14'. The sizing of the aperture 36 and the distance between the aperture 36 and the light receptor 14' is such that the light passing through the aperture 36 is directed against a substantial part and preferably the entire surface of the light receptor 14', but not such that the light also falls on the surface 35 of the block.

The one-piece tip 18 is constructed using an opaque plastic material having a low coefficient of friction. In use, the tip 18 of the reader 10 is in contact with the surface of the record member 11 as reader 10 is moved across the surface of the record member 11. Through continued use the rounded end 24 of the tip 18 will become worn. As the tip 18 is threadably secured to the end of the housing 18 it can be readily removed and replaced with a new tip like the tip 18. As the tip 18 is separate from the optical fibers 14 and as the lens 30, the mask 32 and the light receptor 14' are mounted in the housing 17 independent of the tip 18, removal and replacement of the tip is easily and readily accomplished.

It is preferred to provide the tip with means to render it electrically conductive to retard the accumulation of dust, lint, and the like on the tip 18 due to static electricity. Such an accumulation might interfere with the passage of reflected light through the opening 25 to the light receptor 14', and hence render the reader 10 unreliable. Accordingly, it is preferred to provide a tip 18 constructed of plastic material such as a polytetrafluoroethylene like Teflon, epoxy, or the like, which has included in it electrically conductive material 38 in the form of metal particles, fibers, or the like. The tip 18 can be molded with these particles or fibers in it.

Other embodiments and modifications of this invention will suggest themselves to those skilled in the art, and all such of these as come within the spirit of this invention are included within its scope as best defined by the appended claims.

I claim:

1. A hand-held, optical reader for reading coded records, comprising: an elongated housing a converging tip mounted to one end of the housing, the tip having a light aperture, the tip having a low coefficient of friction enabling the tip to pass readily over and in contact with a coded record; a first bundle of optical fibers connectable to a photodetector external to the housing and extending into the housing, the terminal ends of the optical fibers in the first bundle comprising a light receptor disposed in the housing; a mask having a light aperture spaced from the light receptor, the mask aperture being sized to read only a predetermined zone on the record; lens means disposed in a reflected light path between the tip aperture and the mask for imaging light reflected from the record on the mask, wherein the image distance is approximately equal to the object distance; a light source external to the housing; the lens means, the mask aperture, and the light receptor being mounted inside the housing in a straight line and in axial alignment with the tip aperture; a second bundle of optical fibers receiving light from the light source and extending to within the elongated housing, past the light receptor, past the mask and past the lens means and terminating adjacent the tip aperture in a spread out arrangement so that light conducted through the optical fibers of the second bundle passes through the tip aperture and illuminates the record; and continuous shielding disposed between the second bundle of optical fibers and the reflected light path and terminating adjacent the tip aperture for optically isolating the reflected light path from the light conducted by the second bundle of optical fibers.

2. A hand-held, optical reader for reading coded records, comprising: an elongated housing, a converging tip mounted to one end of the housing, the tip having a light aperture, the tip having a low coefficient of friction enabling the tip to pass readily over and in contact with a coded record; a light receptor mounted in the housing; a mask having a light aperture, the mask aperture being sized to read only a predetermined zone on the record; lens means disposed in a reflected light path between the tip aperture and the mask for imaging light reflected from the record on the mask, the mask aperture being between the lens means and the light receptor; a light source; the lens means, the mask aperture, and the light receptor being mounted inside the housing in a straight line and in axial alignment with the tip aperture; a bundle of optical fibers receiving light from the light source and extending in the housing past the light receptor, past the mask, and past the lens means and terminating adjacent the tip aperture in a spread out arrangement so that light conducted through the optical fibers passes through the tip aperture and illuminates the record; and continuous shielding disposed between the bundle of optical fibers and the reflected light path and terminating adjacent the tip aperture for optically isolating the reflected light path from the light conducted by the bundle of optical fibers.

* * * * *